(12) United States Patent
Tashiro et al.

(10) Patent No.: US 7,680,331 B2
(45) Date of Patent: Mar. 16, 2010

(54) DOCUMENT PROCESSING DEVICE AND DOCUMENT PROCESSING METHOD

(75) Inventors: Kiyoshi Tashiro, Kawasaki (JP);
Masatoshi Tagawa, Ebina (JP); Hiroshi Masuichi, Ashigarakami-gun (JP);
Atsushi Itoh, Ashigarakami-gun (JP);
Kyosuke Ishikawa, Minato-ku (JP);
Shaoming Liu, Ashigarakami-gun (JP);
Michihiro Tamune, Ashigarakami-gun (JP); Naoko Sato, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1330 days.

(21) Appl. No.: 11/071,311

(22) Filed: Mar. 4, 2005

(65) Prior Publication Data

US 2005/0265602 A1    Dec. 1, 2005

(30) Foreign Application Priority Data

May 25, 2004 (JP) .............................. 2004-154970

(51) Int. Cl.
*G06K 9/00* (2006.01)
*G06K 9/46* (2006.01)

(52) U.S. Cl. ...................................... 382/181; 382/208
(58) Field of Classification Search ........................ None
See application file for complete search history.

(56) References Cited

U.S. PATENT DOCUMENTS 4,641,355 A * 2/1987 Hongo et al. ............... 382/220
5,524,065 A * 6/1996 Yagasaki .................... 382/226
5,689,583 A * 11/1997 Niwa et al. ................. 382/181
5,754,671 A * 5/1998 Higgins et al. ............. 382/101
5,920,644 A   7/1999 Fujimoto et al.
5,982,931 A * 11/1999 Ishimaru .................... 382/218
6,038,343 A * 3/2000 Shimizu et al. ............. 382/187
6,671,403 B1 * 12/2003 Takasu et al. .............. 382/187
2002/0143828 A1 * 10/2002 Montero et al. ............ 707/533

FOREIGN PATENT DOCUMENTS

| CN | 1167949 A | 12/1997 |
| JP | A 02-186484 | 7/1990 |
| JP | A 06-266906 | 9/1994 |
| JP | A 09-044606 | 2/1997 |

* cited by examiner

*Primary Examiner*—Bhavesh M Mehta
*Assistant Examiner*—Alex Liew
(74) *Attorney, Agent, or Firm*—Oliff & Berridge, PLC

(57) ABSTRACT

The present invention provides a document processing device including: a general feature vector memory that stores feature vectors of a shape for each of plural characters; an input unit that optically reads in a document; a extracting unit that extracts feature vectors from the shapes of characters in a document read in by the input unit; a general shape recognition unit that estimates a character for which the feature vectors of its shape extracted by the extracting unit, based on the feature vectors extracted by the extracting unit and the content stored in the general feature vector memory; and a specific feature vector memory that stores the feature vectors extracted by the extracting unit in association with an estimation result of the general shape recognition unit.

9 Claims, 5 Drawing Sheets

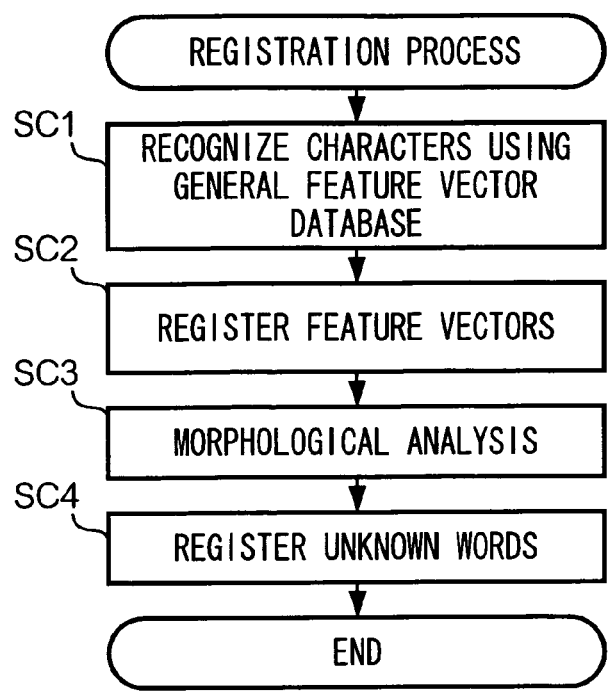
FIG. 3
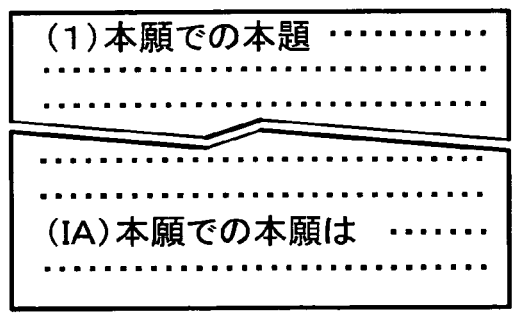
FIG. 4
FIG. 5
| ESTIMATION RESULTS | ACCURACY (%) |
|---|---|
| ( | 98 |
| 1 | 97 |
| ) | 98 |
| 本 (HON) | 99 |
| 願 (GAN) | 96 |
| 本 (HON) | 99 |
| 願 (GAN) | 97 |
| | |
|---|---|
| I | 40 |
| A | 70 |
| ) | 50 |
| 本 (HON) | 96 |
| 願 (GAN) | 95 |
| 本 (HON) | 96 |
| 願 (GAN) | 53 |

FIG. 6

| CHARACTER | FEATURE VECTORS |
|---|---|
| ( | |
| 1 | |
| ) | |
| 本 (HON) | |

D23

| 願 (GAN) | |
|---|---|
| で (DE) | |
| の (NO) | |
| 題 (DAI) | |

FIG. 7

| CHARACTER STRING | APPEARANCE FREQUENCY |
|---|---|
| 本願 (HONGAN) | 2 |
| 本題 (HONDAI) | 1 |

FIG. 11
| ESTIMATION RESULTS | ACCURACY (%) |
|---|---|
| ( | 50 |
| I | 44 |
| ) | 52 |
| 本 (HON) | 96 |
| 題 (DAI) | 40 |
| 本 (HON) | 96 |
|---|---|
| 題 (DAI) | 45 |
| 本 (HON) | 96 |
| 頸 (KEI) | 31 |
FIG. 12
| ESTIMATION RESULTS | ACCURACY (%) |
|---|---|
| ( | 40 |
| 1 | 60 |
| ) | 40 |
| 願 (GAN) | 60 |
| 願 (GAN) | 46 |
| 題 (DAI) | 30 |
FIG. 13
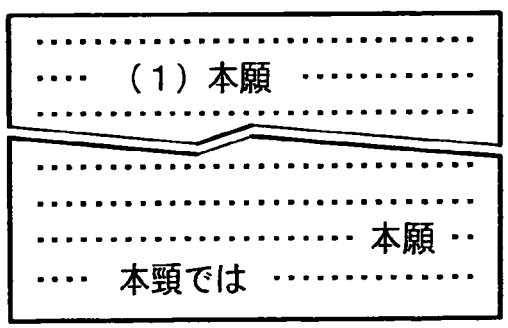
FIG. 14
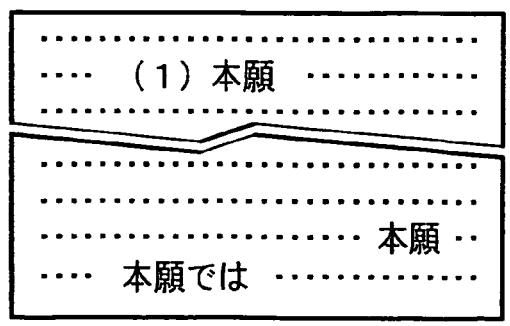

DOCUMENT PROCESSING DEVICE AND DOCUMENT PROCESSING METHOD

This application claims priority under 35 U.S.C. §119 of Japanese Patent Application No. 2004-154970 filed on May 25, 2004, the entire content of which is hereby incorporated by reference.

BACKGROUND OF THE INVENTION

1. Field of the Invention

The present invention relates to technologies which improve precision of recognition when recognizing characters in image data achieved by optically reading a document.

2. Description of Related Art

OCR (Optical Character Recognition), which is a technology for recognizing characters in image data achieved by optically reading a document, is in common use. A variety of technologies have been proposed in the OCR field in order to improve precision in recognition of characters.

It is known to provide a technique for improving precision in recognition by updating a recognition dictionary based on correcting operations by a user. With this technique, characters that could not be recognized or were incorrectly recognized are corrected by correcting operations by a user, whereby a feature vector of a character shape registered in a feature vector database for corrected characters is updated to reflect a feature vector of the character shape when the corrected character is recognized.

It is known to provide a technique for improving precision in recognition by updating a recognition dictionary after performing grammatical analysis. With this technique, a grammatical analysis is performed on recognition results, characters are identified that need to be corrected to grammatically correct characters, and a recognition dictionary is updated to enable recognition of grammatically correct characters without grammatical analysis.

It is known to provide a technique for improving precision in recognition by correcting recognition results performed through a grammatical analysis, using an appearance frequency of words for the correction. With this technique, if, during the grammatical analysis of the recognition results, plural words in a character string in the recognition results are possible candidates, then one word is chosen based on the frequency of appearance of the various words in the recognition results.

In OCR of printed documents, it may be possible to increase the recognition precision by using for the character recognition a feature vector database that is adapted to the fonts used for the printing. For example, the number of fonts that are used in a limited environment, such as a company or a department, are limited, so that it is possible to prepare a feature vector database that is sufficiently adapted to the fonts used for printing. The recognition precision of documents within that limited environment will then improve if such a feature vector database is used.

Moreover, in OCR of handwritten documents, it may be possible to increase the recognition precision by using for the character recognition a feature vector database that is adapted to the authors of those documents. For example, the number of persons that prepare handwritten documents within the above-mentioned limited environment is limited, so that it is possible to prepare a feature vector database that is sufficiently adapted to the authors of those documents. The recognition precision of documents within that limited environment will then improve if such a feature vector database is used.

Moreover, as above-described technology, if a grammatical analysis is added, then it may be possible to improve the recognition precision by performing a grammatical analysis that is adapted to the above-noted limited environment. For example, if uncommon words that are used within this limited environment are registered in a dictionary for grammatical analysis, then it is possible to reduce the number of unknown words (not registered words), which are a reason for a lowered precision in grammatical analysis, thereby increasing the recognition precision. For example, it is also conceivable to increase the recognition precision by registering the usage frequency of the various words used in the above-noted limited environment in the dictionary for grammatical analysis, and to perform the grammatical analysis based on these usage frequencies.

Thus, it is possible to increase the recognition precision by performing a recognition process that is adapted to the characteristics of the documents subjected to OCR. However, in any of these cases, it is necessary to register, in advance, information that is adapted to the characteristics of the documents subjected to OCR in a dictionary used for the recognition. Furthermore, in order to attain a dictionary that is sufficiently adapted to the limited environment, a large amount of information that is adapted to the characteristics of the documents subjected to OCR within the limited environment has to be collected in advance. So far, no technique for collecting this information efficiently has been proposed.

The present invention has been made in view of the above circumstances and provides a technique for the efficient collection of data that contributes to an improvement of estimation accuracy when estimating characters in image data obtained by optically reading a document within a limited environment, without requiring any additional effort.

SUMMARY OF THE INVENTION

The present invention provides a document processing device including: a general feature vector memory that stores feature vectors of a shape for each of plural characters; an input unit that optically reads in a document; a extracting unit that extracts feature vectors from the shapes of characters in a document read in by the input unit; a general shape recognition unit that estimates a character for which the feature vectors of its shape extracted by the extracting unit, based on the feature vectors extracted by the extracting unit and the content stored in the general feature vector memory; and a specific feature vector memory that stores the feature vectors extracted by the extracting unit in association with an estimation result of the general shape recognition unit.

With this document processing device, when optically reading a document and printing the document, feature vectors are extracted from the shapes of characters in the read document, the characters are estimated using these extracted feature vectors, and the feature vectors are stored in association with these characters.

BRIEF DESCRIPTION OF THE DRAWINGS

Embodiments of the present invention will be described in detail based on the following figures, wherein:

FIG. 3 is a flowchart of a registration process performed by the document processing device 2;

FIG. 4 is a view showing an example of estimation results in the registration process;

FIG. 5 is a schematic view showing an excerpt from an example of accuracy in the estimation results in the registration process;

FIG. 6 is a schematic view showing an example of content of a specific feature vector database D23 in the document processing device 2;

FIG. 7 is a schematic view showing an example of content of a specific word dictionary D24 in the document processing device 2.

FIG. 8 is a view showing an example of a document input to the document processing device 2;

FIG. 10 is a view showing an example of estimation results in the middle of the OCR process;

FIG. 11 is a schematic view showing an excerpt from an example of accuracy in the estimation results in the middle of the OCR process;

FIG. 12 is a schematic view showing an excerpt from an example of accuracy in the estimation results in the middle of the OCR process;

FIG. 13 is a view showing an example of estimation results in the middle of the OCR process;

FIG. 14 is a view showing an example of final estimation results in the OCR process.

DETAILED DESCRIPTION OF THE INVENTION

Below is a description of an embodiment according to the present invention, with reference to the drawings.

Configuration

Figure 1:
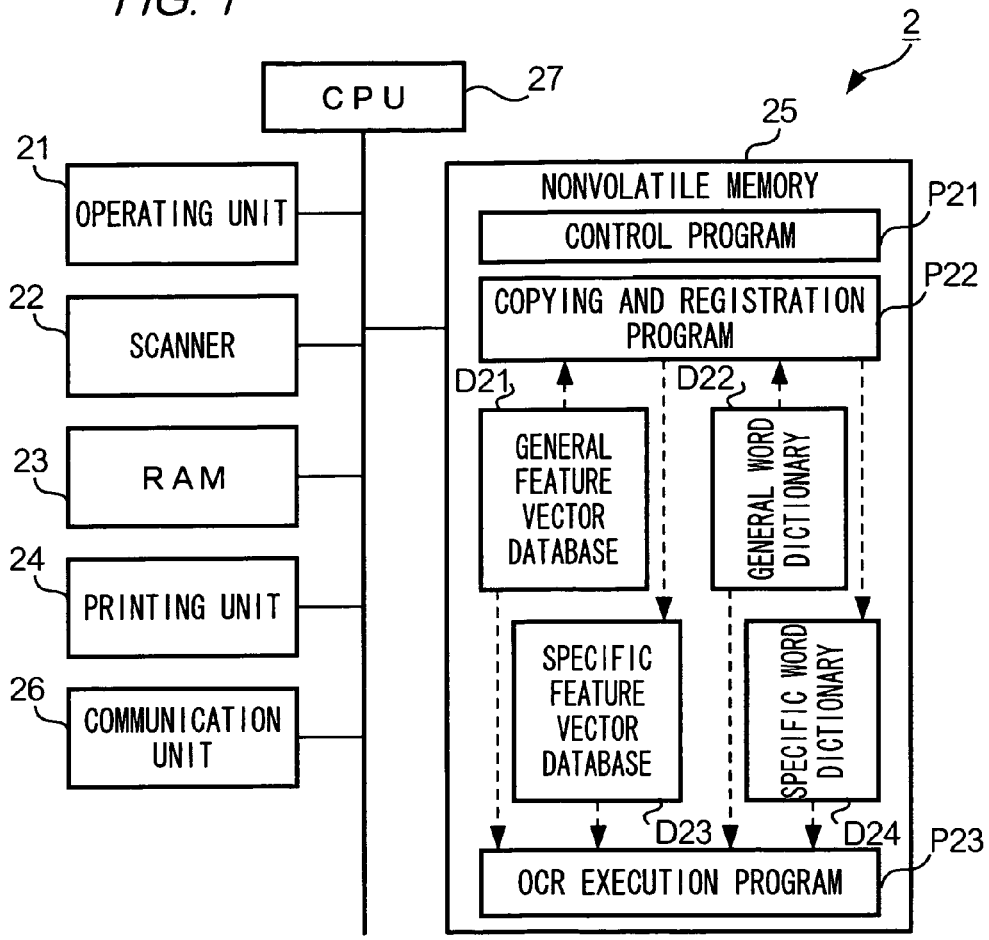
FIG. 1 is a block diagram which shows a configuration of a document processing device 2 according to an embodiment of the present invention.

FIG. 1 is a block diagram which shows a configuration of a document processing device 2 according to an embodiment of the present invention.

The document processing device 2 is installed in a company such that it is shared by employees of the company, and has: an operating unit 21, into which instructions from an employee are input through operation by the employee; a scanner 22, wherein a document set on a document holder (not illustrated) of the document processing device 2 is optically read and input as image data; a RAM 23, in which the image data is temporarily stored; a printing unit 24 that forms an image from the image data stored in the RAM 23 is formed on paper and ejects the paper out from the document processing device 2 as a document; a nonvolatile memory 25, in which data is stored; a communication unit 26 that exchanges data via a communication path (not illustrated) with an external device not illustrated in the drawings; and a CPU 27 controlling the various units.

The nonvolatile memory 25 can hold data without power being supplied from a power source not illustrated in the drawings, and stores a control program P21, which is used when the CPU 27 controls each unit; a copying and registration program P22 for letting the document processing device 2 perform a copying and registration process described below; an OCR execution program P23 for letting the document processing device 2 perform an OCR process described below; a general feature vector database D21, which is used for OCR; and a general word dictionary D22, which is used for OCR. In the general feature vector database D21, characters and feature vectors of character shapes are associated for all characters used in ordinary documents. In the general word dictionary D22, words used in general documents are registered.

The nonvolatile memory 25 also stores a specific feature vector database D33 and a specific word dictionary D24. In the specific feature vector database D23, characters and feature vectors of character shapes are associated that appear in documents copied in the above-mentioned company. In the specific word dictionary D24, character strings and appearance frequencies are associated and registered for unknown words, which are words that appear in documents copied in the above-mentioned company but are not registered in the general word dictionary D22. The appearance frequency of words is the number of times a word appears in documents input to the document processing device 2. Note that nothing is registered in the specific feature vector database D23 and the specific word dictionary D24 in their initial state.

Once supplied with electric power from a power source not included in the drawings, the CPU 27 reads the control program P21 from the nonvolatile memory 25 and executes it. This enables the CPU 27 to control the various units of the document processing device 2. When a copy instruction is input using the operating unit 21, the CPU 27 reads the copying and registration program P22 from the nonvolatile memory 25 and executes it. With this, the document processing device 2 performs the copying and registration process. When an OCR process instruction is input into the CPU 27 in the above state using the operating unit 21, the CPU 27 reads the OCR execution program P23 from the nonvolatile memory 25 and executes it. With this, the document processing device 2 performs the OCR process. These processes are described in conjunction with the operation of the document processing device 2. When the CPU 27 is in this state and receives a predetermined request via the communication unit 26, the CPU 27 reads results of the OCR process from a predetermined area in the nonvolatile memory 25 and sends them to where the request originated.

Operation

Below is a description of operations of a document processing device 2 configured as described above.

Figure 2:
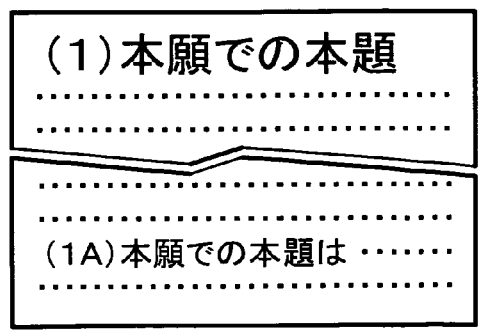
FIG. 2 is a view showing an example of a document input to the document processing device 2.
Figure 9:
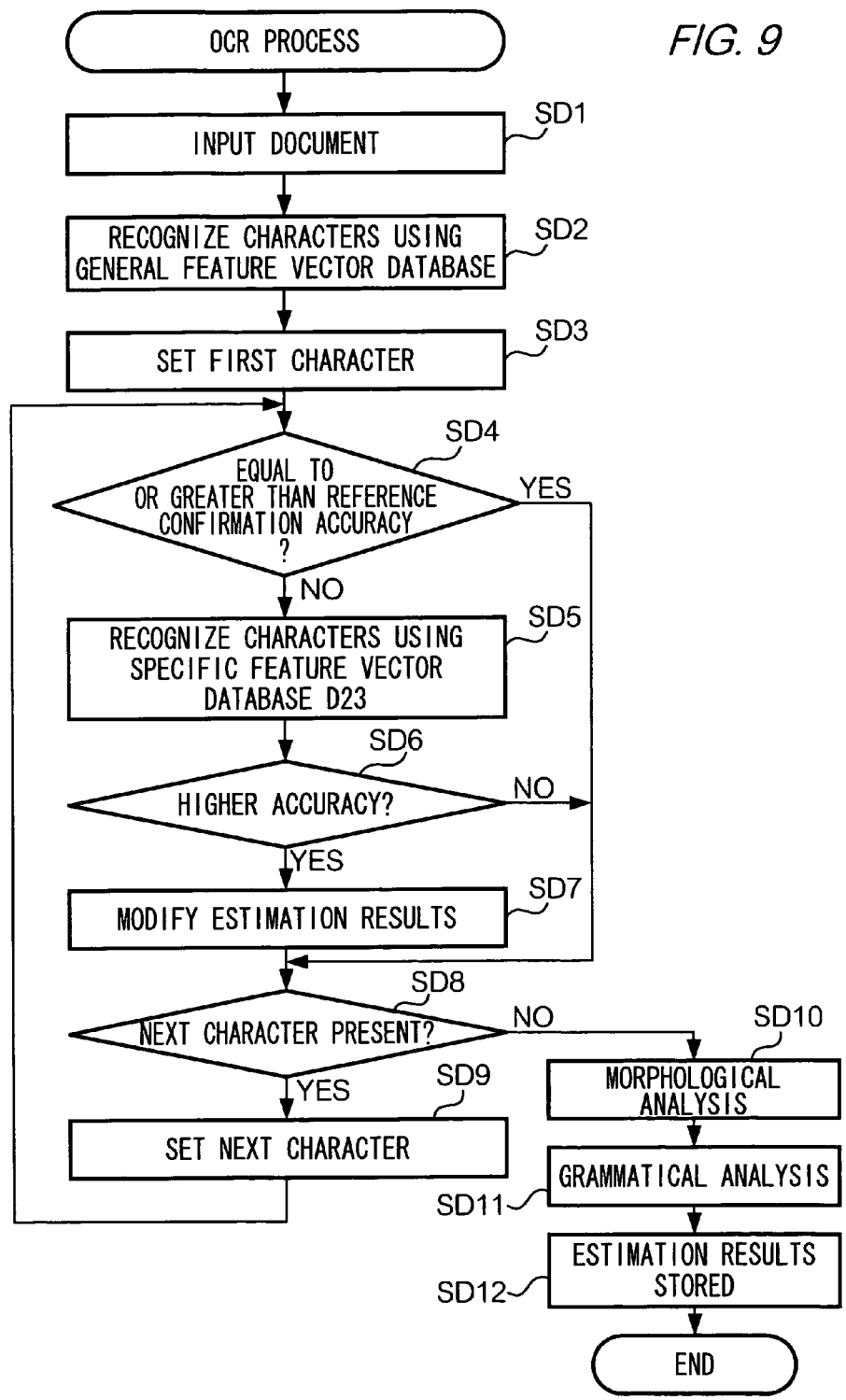
FIG. 9 is a flowchart of an OCR process performed by the document processing device 2.

First, an employee No. 1 sets a Japanese-language document expressing FIG. 2 in a document holder. The Japanese words "本願"(Hongan) and "本願"(hondai) are the only words appearing in the documents which are not registered in the general word dictionary D22. These words appear twice each in the document. Furthermore, characters in a top portion of the document (a portion which is read first), are larger than characters appearing in other portions.

Next, the employee uses an operating unit 21 to input a copy instruction. With this, a CPU 27 performs a copying and registration process.

In the copying and registration process, the CPU 27 inputs the document set in the document holder as image data optically read by the scanner 22, writes the image data to the RAM 23, and, using the printing unit 24, forms an image from the image data on paper and ejects the paper out from the document processing device 2. In this manner the document is copied.

The CPU 27 performs a registration process shown in FIG. 3 in parallel with this copying.

First, character recognition is performed using the general feature vector database D21 (step SC1). Specifically, the image data stored in the RAM 23 is segmented into single character units. For all segmented image data, a process wherein feature vectors for character shapes are extracted from the image data, and a process wherein the extracted feature vectors are compared with the feature vectors stored in the general feature vector database D21 and characters are estimated, are performed. The accuracy of the estimations is also calculated. In this manner, estimation results shown in FIG. 4 and the accuracy shown as an excerpt in FIG. 5 are achieved for the document shown in FIG. 2. As is clear from the drawings, the accuracy of the estimation results for large characters is relatively higher.

Next, estimation results (characters) with sufficiently high accuracies are associated with the feature vectors extracted during the estimation and registered in the specific feature vector database D23 (step SC2). Determining whether an accuracy is sufficiently high is done by comparing the accuracy of the estimation results (characters) with a predetermined reference registration accuracy (95% for the document processing device 2), and determining whether the estimation results were achieved at an accuracy equal to or higher than the reference registration accuracy. As is clear from this description, "本"(hon) is registered four times, for example. However, after the first registration of "本"(hon), only the feature vectors are written to the nonvolatile memory 25. In this manner, as shown in FIG. 6, the characters "(", "1", ")", "本"(hon), "願"(gan), "で"(de), "の"(no), and "題"(dai) are associated with their feature vectors and registered in the specific feature vector database D23.

Next, a morphological analysis is performed on character strings in the estimation results (step SC3). This segments the character strings in the estimation results into words. Next, unknown words are extracted from the words achieved through this morphological analysis using the general word dictionary D22, the character strings of unknown words with sufficiently high accuracy are registered in the specific word dictionary D24, and the registration process is terminated.

Determining whether a word is an unknown word with sufficiently high accuracy is done by determining whether the estimation results for all characters constituting the unknown word were achieved at an accuracy equal to or higher than the reference registration accuracy. For example, "本願"(hongan) which appears in an end portion and "本願"(hongan) and "本題"(hondai) which appear in a starting portion of the document in FIG. 2 are determined to be unknown words with sufficiently high accuracy, while "本題"(hondai) which appears in the end portion is determined not to be an unknown word with sufficiently high accuracy.

The operation of registering to the specific word dictionary D24 depends on whether a character string to be registered is registered in the specific word dictionary D24. If the character string to be registered is not registered in the specific word dictionary D24, then the CPU 27 associates the character string with an appearance frequency "1" and registers it in the specific word dictionary D24. If it is already registered, then 1 is added to the appearance frequency which is associated with the character string and which is registered in the specific word dictionary D24. As shown in FIG. 7, as a result of this manner of registration, the character string "本願"(hongan) and the appearance frequency "2" are associated and registered, and the character string "本題"(hondai) and the appearance frequency "1" are associated and registered in the specific word dictionary D24.

Next, an employee No. 2 sets a Japanese-language document as shown in FIG. 8 in the document holder. In this document, "(1) hongan" appears in a starting portion, while "本願"(hongan) and "本題では"(hondai de wa) appear in an end portion. Next, the employee uses the operating unit 21 to input an OCR instruction. With this, the CPU 27 performs an OCR process.

In the OCR process, the CPU 27 inputs the document set in the document holder as image data optically read by the scanner 22 and writes this image data to the RAM 23 (step SD1). Next, character recognition is performed on this image data using the general feature vector database D21 (step SD1). The content of this character recognition is the same as in step SC1 in FIG. 3. Thus, estimation results shown in FIG. 10 and the accuracy shown as an excerpt in FIG. 11 are achieved for the document shown in FIG. 8. As is clear from the drawings, a mistaken estimation has occurred at this stage. Specifically, the estimation result of "1" in the document is "I", and the estimation results for the character "願"(gan) are the characters "題"(dai) or "頚"(kei).

Next, a process is performed, wherein: if the estimation accuracy for each character in the estimation results is sufficiently high, the current estimation results (the estimation results using the general feature vector database D21) are adopted, but if it is not sufficiently high, character recognition is performed using the specific feature vector database D23; and further if the accuracy of the estimation results for this character recognition is higher than the accuracy of the estimation results using the general feature vector database D21, then the estimation results using the specific feature vector database D23 are used, but if it is not higher, then the estimation results using the general feature vector database D21 are used (steps SD3-SD9).

Determining whether the accuracy of the estimation is sufficiently high is done by comparing the accuracy of the estimations using the general feature vector database D21 with a predetermined reference confirmation accuracy (90% for the document processing device 2), and determining whether the estimation results were achieved at an accuracy equal to or higher than the reference confirmation accuracy. For example, only for the three characters "本"(hon) is the accuracy of the estimation sufficiently high in FIG. 11. Character recognition using the specific feature vector database D23 is performed for characters other than these three. The estimation results and accuracies achieved in this manner are shown as an excerpt in FIG. 12.

"(", "1", ")", the first "願"(gan), the second "願"(gan), and "題"(dai) in FIG. 12 correspond respectively to the "(", "I", ")", the first "題"(dai), the second "題"(dai), and "頚"(kei) in FIG. 11. Within this relationship of correspondences, the accuracy in FIG. 12 is higher than the accuracy in FIG. 11 for the "1", the first "願"(gan), and the second "願"(gan) in FIG. 12. Accordingly, the adopted estimation results are as shown in FIG. 13. As is clear from the drawings, only one mistaken estimation ("頚" (kei)) has occurred at this stage.

Next, morphological analysis is performed on character strings in the adopted estimation results. (step SD10). Then, the results of the morphological analysis are used to achieve the final estimation results using grammatical analysis (step SD11). Next, the final estimation results are written to the predetermined area in the nonvolatile memory 25 (step SD12) and the OCR process is terminated. Below is a description of the grammatical analysis in step SD11.

The CPU 27 uses the general word dictionary D22 and the specific word dictionary D24 in the grammatical analysis. As shown in FIG. 7, "本願"(hongan) and "本題"(hondai) are registered in the specific word dictionary D24, so the CPU 27 need not treat these character strings as unknown words. In this analysis, the CPU 27 finds words which create grammatical mistakes in the estimation results, looks up whether the words which are found are confirmed words, and if they are not, then it determines whether words exist which do not create grammatical mistakes as replacement options for the words, and if such words exist, then it selects optimum words from among the replacement options, and uses them instead of the words which create the grammatical mistakes.

"本願"(honkei) in FIG. 13 is an example of a grammatical mistake. In this case, the CPU 27 detects "本願"(honkei) as a word which creates a grammatical mistake. The accuracy for the "本"(hon) in "本願"(honkei) is equal to or higher than the reference confirmation accuracy, but the accuracy for "願"(kei) is lower than the reference confirmation accuracy. Therefore "本願"(honkei) is not a confirmed word since it includes a questionable character. Moreover, while this was not included in the description, when "願"(kei) became an estimation result, its accuracy was 31% after character recognition using the specific feature vector database D23, while the accuracy of "顔"(gan) was 29%. These accuracies are both equal to or higher than the predetermined reference replacement accuracy (25% for the document processing device 2), and since neither "本願"(hondai) nor "本願"(hongan) would create a grammatical mistake, "本願"(hondai) and "本願"(hongan) exist as replacement options. Only one of these replacement options is selected, and the criterion for selection is the accuracy and appearance frequency of each. As described above, there is not a large difference between the accuracies of each, but as shown in FIG. 7, there is a large difference (double) between the appearance frequencies. Therefore, "本願"(hongan), which has the higher appearance frequency, is chosen, and is used instead of "本願"(honkei) Accordingly, the final estimation results are as shown in FIG. 14.

After the OCR process, the employee No. 2 uses a computer capable of communicating with the document processing device 2 to send a predetermined request to the document processing device 2. This request is received by the CPU 27 via the communication unit 26. In response, the CPU 27 reads the final estimation results from the predetermined area in the nonvolatile memory 25 and sends them to the computer where the requested originated. In this manner, the results of the OCR process are passed to the employee No. 2.

CONCLUSION

As described above, a user can cause data to accumulate in a document processing device 2 which contributes to improvement of the estimation accuracy when estimating characters in image data achieved by optically reading documents in a company simply by causing the document processing device 2 to optically read and print documents. In addition, this accumulation is done without the user being conscious of it. Furthermore, since the document processing device 2 is shared by employees, accumulation of the data can be performed efficiently.

The user can achieve recognition results with sufficiently high precision by performing an OCR process with the document processing device 2 using the accumulated data.

Moreover, the document processing device 2 only accumulates the above-mentioned data if characters and/or character strings are estimated at sufficiently high accuracies. Accordingly, it is possible without fail to avoid situations wherein incorrect data is accumulated and recognition precision drops.

The above embodiment may also be varied as described below.

For example, it is possible not to use the specific feature vector database D23 in the OCR process, and it is also possible not to use the specific word dictionary D24. It is also possible not to register the appearance frequency in the specific word dictionary D24, and it is also possible to treat character strings registered in the specific word dictionary D24 in the OCR process as unknown words.

It is also possible to make it possible to send the specific feature vector database D23 and the specific word dictionary D24 to another device in response to a request from that device.

Naturally, it is also possible to apply this to character recognition in any document including documents written in natural languages other than Japanese and computer program lists.

As discussed above, the present invention provides a document processing device including: a general feature vector memory that stores feature vectors of a shape for each of plural characters; an input unit that optically reads in a document; a extracting unit that extracts feature vectors from the shapes of characters in a document read in by the input unit; a general shape recognition unit that estimates a character for which the feature vectors of its shape extracted by the extracting unit, based on the feature vectors extracted by the extracting unit and the content stored in the general feature vector memory; and a specific feature vector memory that stores the feature vectors extracted by the extracting unit in association with an estimation result of the general shape recognition unit.

With this document processing device, when optically reading a document and printing the document, feature vectors are extracted from the shapes of characters in the read document, the characters are estimated using these extracted feature vectors, and the feature vectors are stored in association with these characters.

Also, the present invention provides a document processing device including: a general word memory that stores words; an input unit that optically reads in a document; a recognition unit that estimates character strings constituting the document read in by the input unit from the shapes of characters in that document; an unknown word detection unit that extracts words that are not stored in the general word memory from an estimation result of the recognition unit; and a specific word memory that stores the words extracted by the unknown word detection unit.

With this document processing device, when optically reading a document and printing the document, the characters constituting the read document are estimated from the shapes of the characters in the document, and words that are not stored in the general word storage unit are extracted from this estimation result and stored in the specific words storage unit.

Also, the present invention provides a document processing device including: a frequency memory that stores a frequency with which a word appears for each of plural words; an input unit that optically reads in a document; a recognition unit that estimates character strings constituting the document read in by the input unit from the shapes of characters in that document; and an updating unit that updates the frequencies stored in the frequency memory, based on an estimation result of the recognition unit.

With this document processing device, when optically reading a document and printing the document, the characters constituting the read document are estimated from the shapes of the characters in the document, and the appearance frequencies of words, which are stored in the frequency storage unit, are updated based on this estimation result.

The above-described document processing devices enable the collection of data that contributes to an improvement of estimation accuracy when estimating characters in image data obtained by optically reading a document within a limited environment, such as a company or department where this document processing device is set up, simply by letting this document processing device read in and print documents. Furthermore, the more users optically read in and print documents with these document processing devices, the more efficient the collection of data can be performed.

Also, the present invention provides a document processing method performed by a document processing device shared by predetermined users, including: receiving a document and an instruction, performing a process the received document in accordance with the received instruction, and outputting the processed document, while recognizing characters on the received document and obtaining and storing information reflecting a character recognition accuracy; and receiving a document and recognizing characters on the received document on the basis of the stored information.

This document processing method enables the collection of data that contributes to an improvement of estimation accuracy when estimating characters in image data obtained by optically reading a document within a limited environment, such as a company or department where this document processing device is set up, simply by letting this document processing device read in and print documents. Furthermore, the more users optically read in and print documents with these document processing devices, the more efficient the collection of data can be performed. Also, the collected data is used for the character recognition in the execution step, so that it is possible to recognize characters with a sufficiently high precision.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. A document processing device comprising:
a general feature vector memory that stores feature vectors of a shape for each of a plurality of characters;
an input unit that optically reads in a document;
an extracting unit that extracts feature vectors from the shapes of characters in a document read in by the input unit;
a general shape recognition unit that estimates a character for which the feature vectors of its shape extracted by the extracting unit, based on the feature vectors extracted by the extracting unit and the content stored in the general feature vector memory; and
a specific feature vector memory that stores the feature vectors extracted by the extracting unit in association with an estimation result of the general shape recognition unit and in association with a character recognition accuracy such that a plurality of feature vectors is associated with a single estimation result.

2. The document processing device according to claim 1, wherein the specific feature vector memory stores the estimation result of the general shape recognition unit and the feature vectors extracted by the extracting unit only if an estimation accuracy attained by the general shape recognition unit is sufficiently high.

3. The document processing device according to claim 1, further comprising:
a specific shape recognition unit that estimates a specific character for which the feature vectors of its shape extracted by the extracting unit, based on the feature vectors extracted by the extracting unit and the content stored in the specific feature vector memory; and
a shape recognition memory that stores an estimation result of the specific shape recognition unit if an estimation accuracy attained by the general shape recognition unit is not sufficiently high and the estimation accuracy attained by the specific shape recognition unit is higher than the estimation accuracy attained by the general shape recognition unit, and stores an estimation result of the general shape recognition unit otherwise.

4. A document processing device comprising:
a frequency memory that stores a frequency with which a word appears for each of a plurality of words;
an input unit that optically reads in a document;
a recognition unit that estimates character strings constituting the document read in by the input unit from the shapes of characters in that document, the recognition unit comprises:
a shape recognition unit that estimates characters in the document read in by the input unit based on the shapes of those characters; and
a word frequency unit that performs a grammatical analysis on character strings made of the estimation result of the shape recognition unit, based on the content stored in the frequency memory, to correct those character strings and take the corrected character strings as the estimation result;
an updating unit that updates the frequencies stored in the frequency memory, based on an estimation result of the recognition unit; and
a frequency recognition memory that stores an estimation result of the recognition unit.

5. The document processing device according to claim 1, further comprising an operating unit which can be operated by a user;
wherein the input unit optically reads a document when a predetermined instruction is entered using the operating unit.

6. A document processing method performed by a document processing device shared by predetermined users, comprising:
receiving a first document and an instruction;
performing a process on the received first document in accordance with the received instruction, the process including extracting feature vectors from shapes of characters in the first document;
outputting the processed first document, while recognizing characters on the received first document based on the feature vectors extracted from the first document and a content stored in a general feature vector memory;
obtaining information reflecting a character recognition accuracy;
storing information reflecting extracted feature vectors and a character recognition accuracy in a specific feature vector memory;
receiving a second document;

recognizing characters on the received second document on the basis of the information stored in the specific feature vector memory.

7. The document processing method according to claim 6, wherein the recognizing step further comprises:

performing a process on the received second document, the process including extracting feature vectors from the shapes of characters in the second document;

estimating a first specific character and a first estimation accuracy based on the feature vectors extracted from the second document and the content stored in the general feature vector memory;

estimating a second specific character and a second estimation accuracy based on the feature vectors extracted from the second document and the information stored in the specific feature vector memory; and storing a second estimation result if a first estimation accuracy attained by the general shape recognition unit is not sufficiently high and the second estimation accuracy attained by the specific shape recognition unit is higher than the first estimation accuracy attained by the general shape recognition unit, else storing a first estimation result.

8. A document processing device comprising:

a general feature vector memory that stores feature vectors of a shape for each of a plurality of characters;

an input unit that optically reads in a first document;

an extracting unit that extracts feature vectors from the shapes of characters in the first document read in by the input unit;

a general shape recognition unit that estimates a character for which the feature vectors of its shape extracted by the extracting unit, based on the feature vectors extracted by the extracting unit and the content stored in the general feature vector memory; and a specific feature vector memory that stores the feature vectors extracted by the extracting unit in association with an estimation result of the general shape recognition unit and in association with a character recognition accuracy, such that characters of a second document are recognizable based on the information stored in the specific feature vector memory.

9. The document processing device according to claim 1, further comprising a morphological analysis unit that performs a morphological analysis on the estimation result of the general shape recognition unit.

* * * * *